United States Patent
Abzarian et al.

(10) Patent No.: US 8,676,714 B2
(45) Date of Patent: Mar. 18, 2014

(54) HARDWARE SPECIFIC PRODUCT LICENSE VALIDATION

(75) Inventors: David Abzarian, Kirkland, WA (US); Todd L Carpenter, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 12/482,946

(22) Filed: Jun. 11, 2009

(65) Prior Publication Data

US 2010/0319072 A1  Dec. 16, 2010

(51) Int. Cl.
*G06F 21/00* (2013.01)

(52) U.S. Cl.
USPC ............... 705/59; 705/50; 705/51; 726/1

(58) Field of Classification Search
USPC ................................. 726/28; 705/59
See application file for complete search history.

(56) References Cited

U.S. PATENT DOCUMENTS

| | | | |
|---|---|---|---|
| 5,790,663 A * | 8/1998 | Lee et al. ................. | 705/56 |
| 6,006,190 A | 12/1999 | Baena-Arnaiz et al. | |
| 6,108,420 A * | 8/2000 | Larose et al. ............ | 705/59 |
| 6,169,976 B1 * | 1/2001 | Colosso ..................... | 705/59 |
| 6,460,140 B1 * | 10/2002 | Schoch et al. ........... | 726/22 |
| 6,898,286 B2 * | 5/2005 | Murray ..................... | 380/202 |
| 6,920,567 B1 * | 7/2005 | Doherty et al. ........... | 726/22 |
| 7,313,828 B2 * | 12/2007 | Holopainen ............... | 726/29 |
| 7,346,585 B1 * | 3/2008 | Alabraba et al. ......... | 705/59 |
| 7,506,382 B2 | 3/2009 | Padole et al. | |
| 7,610,631 B2 * | 10/2009 | Frank et al. ............... | 726/30 |
| 7,664,706 B2 * | 2/2010 | Stransky et al. ......... | 705/51 |
| 7,757,296 B2 * | 7/2010 | Baissus et al. ............ | 726/26 |
| 7,797,372 B2 * | 9/2010 | Greschler et al. ........ | 709/201 |
| 7,844,572 B2 * | 11/2010 | Walker et al. ............ | 707/607 |
| 7,962,416 B1 * | 6/2011 | Durbin et al. ............ | 705/59 |
| 2002/0120726 A1 | 8/2002 | Padole et al. | |
| 2004/0133792 A1 * | 7/2004 | Dublish et al. .......... | 713/193 |
| 2005/0027657 A1 * | 2/2005 | Leontiev et al. ......... | 705/59 |
| 2005/0289072 A1 * | 12/2005 | Sabharwal ................ | 705/59 |
| 2007/0240161 A1 * | 10/2007 | Prabhakar et al. ....... | 718/104 |
| 2008/0040619 A1 * | 2/2008 | Dublish et al. .......... | 713/193 |
| 2010/0091676 A1 * | 4/2010 | Moran et al. ............. | 370/252 |

FOREIGN PATENT DOCUMENTS

JP  2001014154 A  *  1/2001  ............... G06F 9/06

OTHER PUBLICATIONS

Manoharan, et al., "Software Licensing: A Classification and Case Study", retrieved on Apr. 16, 2009 at /ieeexplore.Ieee.org/stamp/stamp.jsp?arnumber=04063794>>, Proceedings of the First International Conference on the Digital Society (ICDS 07), IEEE 2007, 4 pages. Retreived from IDS.*

"Determine Device Hardware Identifiers and Device Setup Classess", retrieved on Apr. 16, 2009 at <<http://technet.microsoft.com/en-us/library/cc755201.aspx>>, Aug. 31, 2007, Microsoft Corporation, 1 page.

Manoharan, et al., "Software Licensing: A Classification and Case Study", retrieved on Apr. 16, 2009 at <<http://ieeexplore.ieee.org/stamp/stamp.jsp?arnumber=04063794>>, Proceedings of the First International Conference on the Digital Society (ICDS 07), IEEE 2007, 4 pages.

(Continued)

*Primary Examiner* — James A Reagan

(74) *Attorney, Agent, or Firm* — Stephen A. Wight; Carole Boelitz; Micky Minhas

(57) ABSTRACT

Server-side validation of hardware specific software product licenses is described herein.

20 Claims, 7 Drawing Sheets

(56) References Cited

OTHER PUBLICATIONS

"Software Activation", retrieved on Apr. 16, 2009 at <<http://www.palisade.com/support/activation.asp>>, Palisade Corporation, 2009, 2 pages.

"Windows Product Activation", retrieved on Apr. 16, 2009 at <<http://en.wikipedia.org/wiki/Windows_Product_Activation>>, Wikipedia, Apr. 9, 2009, 4 pages.

"Windows Vista Activation", retrieved on Apr. 16, 2009 at <<http://www.windows-vista-update.com/Windows_Vista_Activation.html>>, Apr. 16, 2009, Nnigma, Inc., 4 pages.

* cited by examiner

HARDWARE SPECIFIC PRODUCT LICENSE VALIDATION

BACKGROUND

Software products, such as operating systems and applications, may require activation in order to ensure that they have been legitimately purchased. Unique product IDs are often provided to users of a software product and used during activation to ensure that the purchaser is authorized to install the software product. Typically, upon installation and activation of the software product by the user, the user is asked to enter the product ID. The product ID is then transmitted to a licensing entity (typically the software manufacturer) to determine the validity of the product ID.

The software manufacturer may desire to offer the software product at differing prices and/or tiers to the user depending on the type of hardware the software product will be running on. In an example, to entice a user to run the software product on refurbished hardware, a discounted license may be offered. However, offering discounted licenses may result in lost revenues to the software manufacturer by users installing the software product having the discounted license on hardware not allowed to use the discounted license. Upon activation, the user transmits the product ID of the software product with the discounted license to the licensing entity. The licensing entity validates the product ID, but may be unaware that the software product is being installed on hardware not privileged to the discounted license.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present application describes server-side validation of hardware specific software product licenses. Many specific details are set forth in the following description and in FIGS. 1-7 to provide a thorough understanding of various implementations. One skilled in the art will understand, however, that the subject matter described herein may have additional implementations, or that the concepts set forth may be practiced without several of the details described in the following description.

Environment 100

Figure 1:
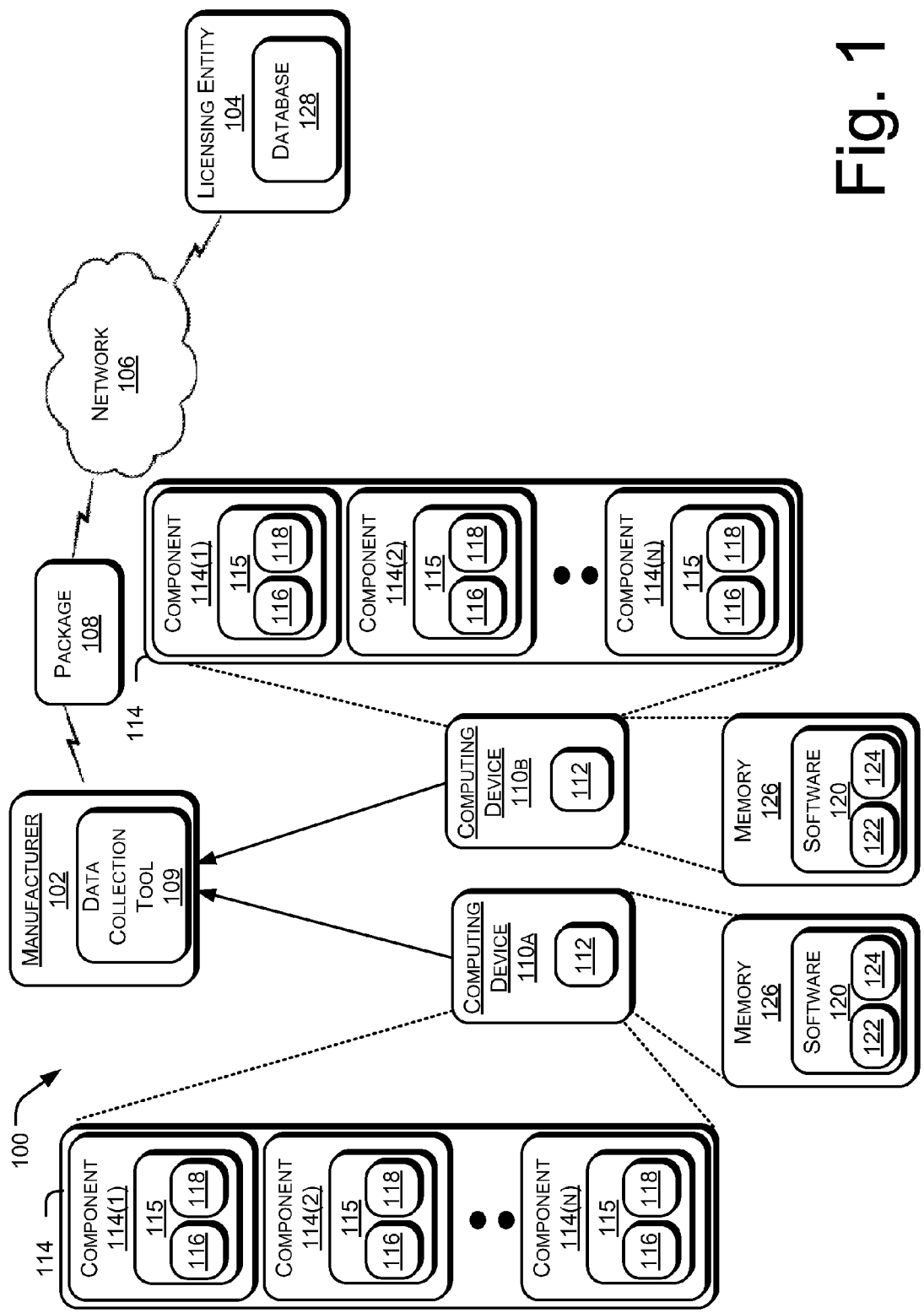
FIG. 1 is a block diagram illustrating an implementation of an environment comprising a supplier and a licensing entity, the supplier transmitting a package to the licensing entity.

FIG. 1 shows an implementation of an environment 100 comprising a supplier 102 and a licensing entity 104 coupled together by a network 106, with supplier 102 communicating a package 108 to licensing entity 104.

Supplier 102

Supplier 102 is a manufacturer, creator, producer, integrator, distributor, or refurbisher of a plurality of computing systems or devices 110. Supplier 102 uses a data collection tool 109 to collect data associated with computing devices 110, described below. Data collection tool 109 is any appropriate data recording software that allows supplier 102 to record and package data and information about computing devices 110, such as a database program, a spreadsheet application, or some custom software designed specifically for this purpose.

Computing devices 110 may include, but are not limited to, such devices as desktop personal computers (PC) 110a and 110b, laptop PC (not shown), netbook (not shown), and cell phones (not shown). Generally, each computing device is a system that includes a number of separately identifiable components, as will be described in more detail below.

Each computing system 110 has a system identifier 112 associated with it or assigned to it. In an implementation, system identifier 112 has an associated alphanumeric value that is unique for each computing system 110. Computing devices 110 each comprise a plurality of components 114(1), 114(2), . . . , 114(n). The exact components will of course vary with the type of computing device. In this example, components 114 might comprise, a CD-ROM, a video adapter, a network adapter, a central processing unit (CPU), a trusted platform module (TPM), a storage device, memory, or some combination of these and other components.

Each of components 114 has an associated component descriptor 115. In this example, each component descriptor 115 comprises a component class identifier 116 and a unique component identifier 118. Component class identifiers 116 and unique component identifiers 118 each have an alphanumeric value associated therewith. Component class identifier 116 identifies a component class to which each component 114 belongs to (e.g. CD-ROM class, video adapter class, etc.). All components of the same class have the same class identifier. Component identifiers 118 are unique to each component 114 regardless of their class or the system of which they are a part.

Each computing system 110 further comprises a software product 120 having a license 122 and a licensing engine 124 associated therewith. License 122 belongs to a license class specifying which hardware software product 120 may be activated on, described further below. Software product 120 resides on a memory 126. In a further implementation, software product 120 is a software service.

Licensing Entity 104

Licensing entity 104 determines if computing devices 110 are permitted to utilize software product 120, described further below. In an implementation, licensing entity 104 comprises a single computing device, i.e., a server computing device (not shown). However, in a further implementation, licensing entity 104 comprises a plurality of computing devices (not shown) coupled together via a network (not shown). Licensing entity 104 further comprises a database 128.

In some situations, licensing entity 104 is the manufacturer of software product 120. In other situations, however, licensing entity 104 might be a different entity.

Network 106

Supplier 102 communicates with licensing entity 104 through network 106. Network 106 may include a wireless interface, and/or a wired interface such as the Internet, in addition to local area networks (LANs); wide area networks (WANs); direct connections, such as through a universal serial bus (USB) port; other forms of computer-readable media; or any combination thereof.

Package 108

Supplier 102 uses some form of data collection tool 109 to collect and package system information regarding computing devices 110. Generally, data collection tool 109 obtains the system identifier 112 of each computing system 110 and a plurality of component descriptors 115 that specify the constituent hardware components of the computing system 110. This information is packaged and transmitted to licensing entity 104 as will be described in more detail below.

Although the system information can be obtained by human input, it can also be collected through some sort of automated process during manufacture, assembly, or testing of the computing devices 110.

Figure 2:
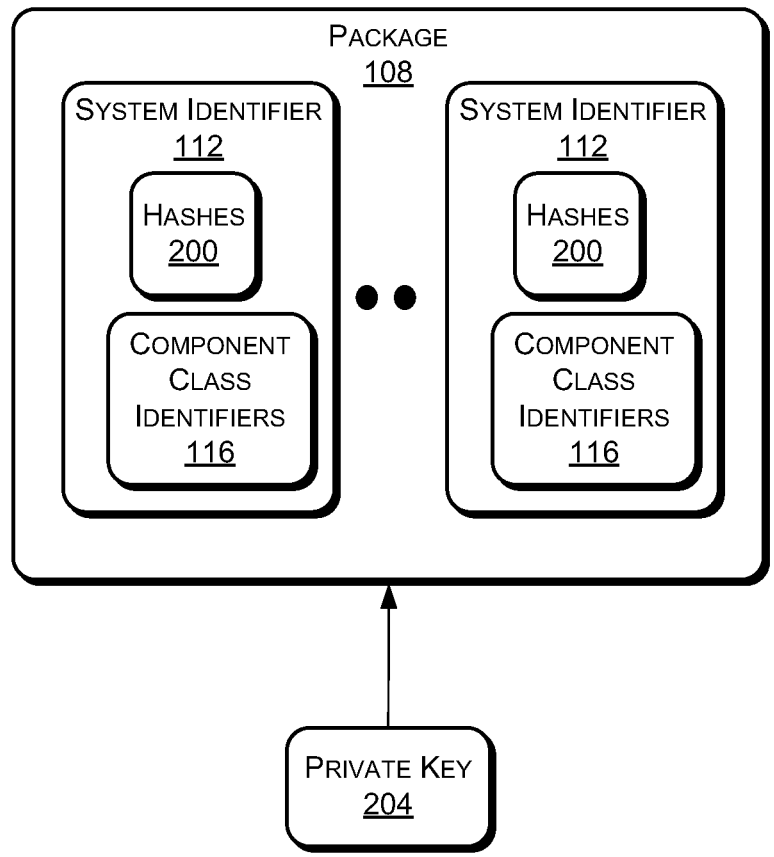
FIG. 2 shows the package of FIG. 1 in more detail.

FIG. 2 shows package 108 in more detail. Package 108 comprises a listing of system identifiers 112 of each computing system 110 manufactured by supplier 102. Each system identifier 112 is associated with component class identifiers 116 and hashes 200 of unique component identifiers 118 of the computing system 110 related to system identifier 112. Hashes 200 are described further below.

Collection

Figure 3:
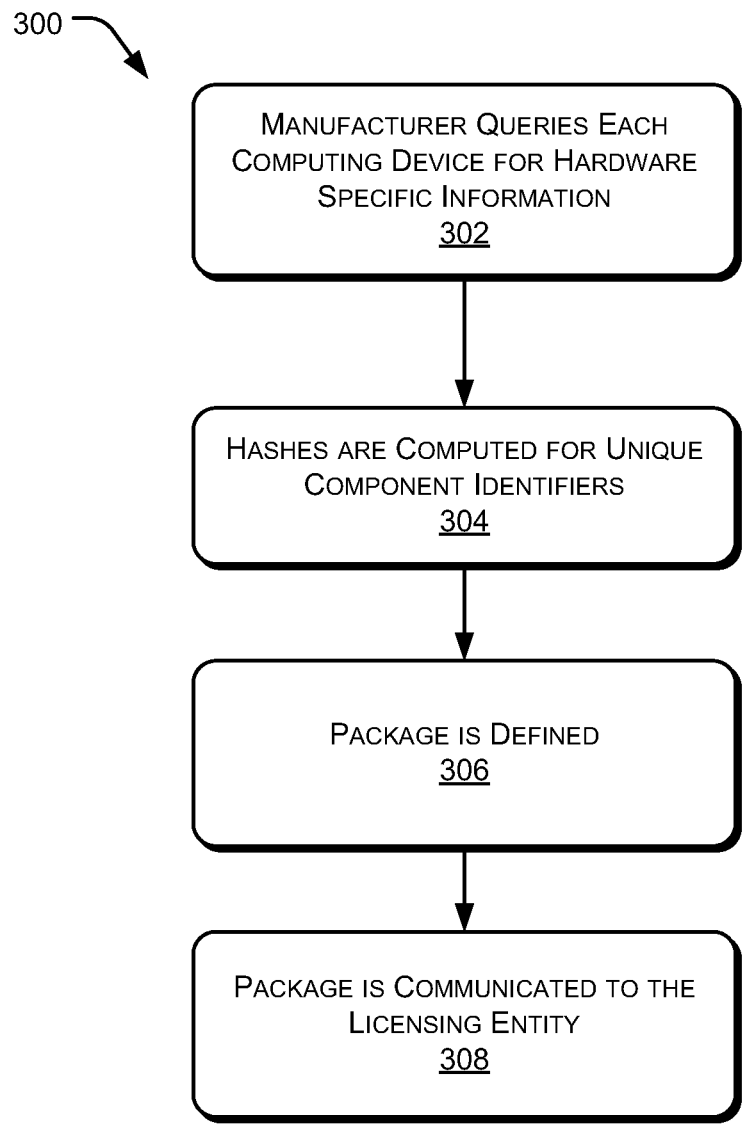
FIG. 3 is a flowchart of a method of the licensing entity collecting hardware specific information of computing devices via the supplier.

FIG. 3 shows a method 300 of collecting hardware specific information of computing devices 110 via supplier 102. The hardware specific information will facilitate categorization of the computing devices 110, described further below. This process will be described with reference to elements of FIGS. 1 and 2.

At step 302, supplier 102 queries each computing system 110 for hardware specific information. In the described embodiment, data collection tool 109 obtains the system identifier 112 of each computing system 110 and further obtains the component class identifiers 116 and unique component identifiers 118 associated with the system identifier 112.

At step 304, supplier 102 computes hashes 200 for unique component identifiers 118 associated with each system identifier 112. Hashes 200 are computed to protect any personally identifiable information that is associated with unique component identifiers 118 and each respective computing system 110. More specifically, hashes 200 prevent licensing entity 104 from gaining any knowledge of the personally identifiable information of computing devices 110. In an implementation, hashes 200 are SHA-256 digests of unique component identifiers 118, SHA-256 digest being an alphanumeric value. However, hashes 200 can be any hashing algorithm based upon the desired implementation.

At step 306, supplier 102 compiles the gathered information to create package 108. Package 108 comprises the system identifier 112 for each computing system 110, and the component class identifiers 116 and hashes 200 for each system identifier 112. After defining package 108, supplier 102 signs package 108 with a private key 204. By employing private key 204, licensing entity 104 is able to verify that computing devices 110 and associated data (system identifier 112, component class identifiers 116, and unique component identifiers 118) came from the supplier 102 who is claiming to communicate the package 108 thereto.

At step 308, supplier 102 communicates package 108 to licensing entity 104 via network 106.

Categorization

Figure 4:
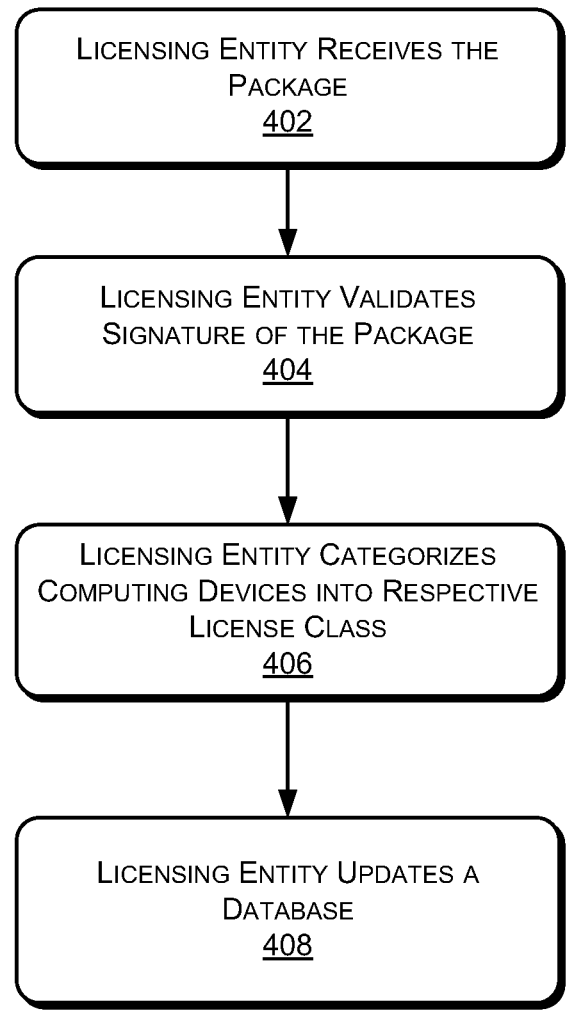
FIG. 4 is a flowchart of a method of the licensing entity categorizing the hardware specific information of the computing devices received from the supplier.

FIG. 4 shows a method 400 of categorizing computing devices 110 received from supplier 102 via the hardware specific information. This process will be described with further reference to FIGS. 1 and 2. Method 400 will typically be performed by licensing entity 104.

At step 402, licensing entity 104 receives package 108 from supplier 102 via network 106.

At step 404, licensing entity 104 validates the signature of package 108. More specifically, licensing entity 104 verify that computing devices 110 and associated data (system identifier 112, component class identifiers 116, and unique component identifiers 118) came from supplier 102 who is claiming to communicate the package 108 to thereto. As a result, computing devices 110 are associated with a particular supplier 102.

At step 406, licensing entity 104 categorizes each computing system 110 into a respective license class. Categorization can be based on different factors. For example, categorization might be based on supplier 102 of computing system 110: all devices from a particular supplier 102 are categorized as being associated with a particular license class. As another example, categorization might be based on which components 114 computing devices 110 have. Computing devices 110 with certain types of components 110 might be categorized as being entitled to one license class, while computing devices 110 with other types of components 110 might be categorized as being entitled to a different license class. As a further example, categorization might be based on a time when computing devices 110 were manufactured. In still a further implementation, categorization may be any scheme to fit the application desired.

The license classes comprises, but is not limited to, a refurbished low end PCs license, a refurbished high end PCs license, a mobile phones license, a netbook license, and a low-cost PCs license. By assigning system identifier 112 to the respective license class, unique component identifiers 118 are further assigned to the respective license class as well.

At step 408, server device 104 updates database 126 with the information categorization information obtained in the above steps.

License Activation

Figure 5:
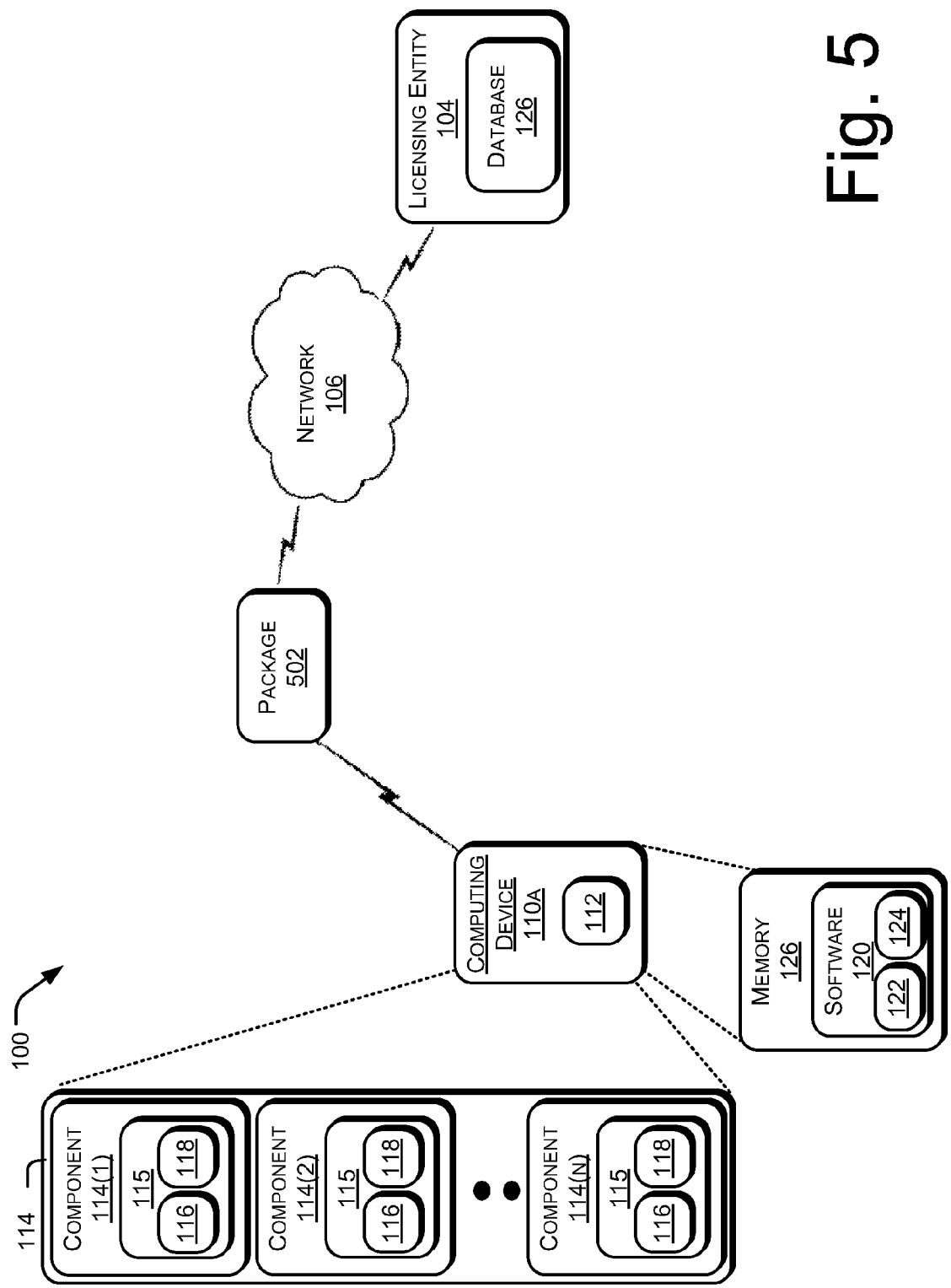
FIG. 5 shows a block diagram illustrating an implementation of an environment comprising the computing device and the licensing entity, the computing device transmitting a package to the licensing entity.

FIG. 5 shows an environment 500 comprising a single computing system 110a and licensing entity 104, configured to communicate with each other via network 106. Computing system 110 communicates a package 502 to licensing entity 104. A user of computing system 110a desires to activate software product 120 on computing system 110a. Activation of software product 120 allows the user to fully utilize the software product 120. However, it is desired to verify that computing system 110a belongs to a license class that is permitted to utilize license 122 of software product 120. To do so, computing system 110a communicates package 502 to licensing entity 104. Package 502 comprises hardware specific information regarding computing system 110a and license 122 thereof, described below.

Package 502

Figure 6:
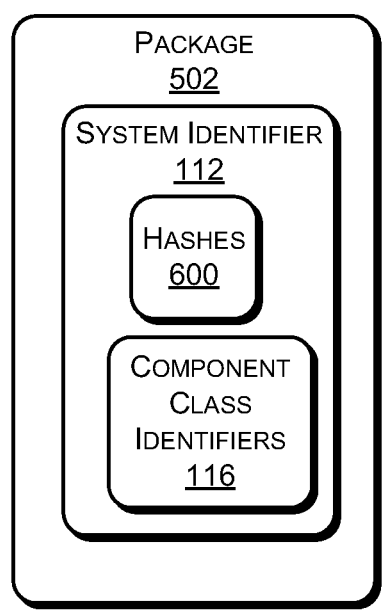
FIG. 6 shows the package of FIG. 5 in more detail.

FIG. 6 shows package 502 in more detail. Package 502 comprises system identifier 112 of computing system 110a. System identifier 112 may or may not be one of the same system identifiers 112 communicated to licensing entity 104 in step 308, mentioned above. The package also includes a plurality of component descriptors 115 that specify constituent hardware components 114 of the computing system 110a. In this example, each component descriptor 115 comprises component class identifiers 116 and hashes 600 of unique component identifiers 118. Hashes 600 are described further below.

License Validation

Figure 7:
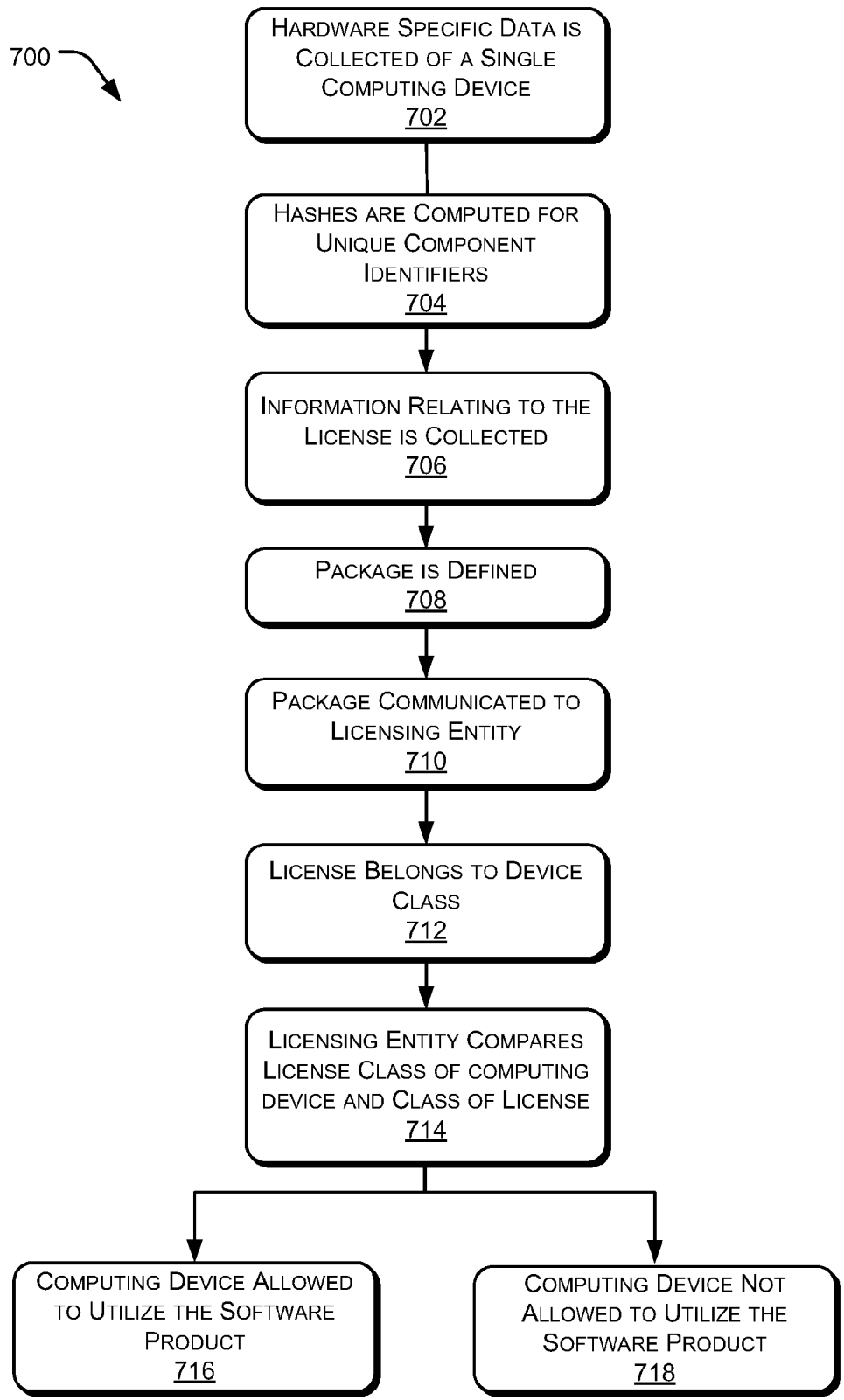
FIG. 7 shows a flowchart of a method of the licensing entity determining if the computing device is permitted to utilize the license of the software product installed thereon.

FIG. 7 shows a method 700 of determining if computing system 110a is permitted to utilize license 122 of software product 120. This process will be described with continuing reference to FIGS. 5 and 6.

At step 702, licensing engine 124 collects the system identifier 112 associated with computing system 110a and further obtains the component class identifiers 116 and the unique component identifiers 118 associated with the system identifier 112.

At step 704, licensing engine 124 computes hashes 600 for unique component identifiers 118. Hashes 600 are computed to protect any personally identifiable information that is associated with unique component identifiers 118 of computing system 110a. More specifically, hashes 600 prevent licensing entity 104 from gaining any knowledge of the personally identifiable information of computing system 110a. In an implementation, hashes 200 are SHA-256 digests of the unique component identifiers 118, SHA-256 digest being an alphanumeric value.

At step 706, licensing engine 124 collects information relating to license 122, i.e. a key or a certificate of license 122. In an implementation, a user of computing system 110a is prompted to enter the information related to license 122. In a further implementation, this information is defined within license 122 through software product 120.

At step 708, licensing engine 124 compiles the gathered information into package 502. Package 502 comprises the system identifier 112 for computing system 110a, and the component class identifiers 116 and hashes 600 for the system identifier 112. After defining package 502, licensing engine 124 electronically encrypts package 502 such that compromise by a third party of package 502 is minimized.

At step 710, licensing engine 124 communicates package 502 through computing system 110a to licensing entity 104 via network 106. By communicating package 502, computing system 110a is requesting a validation of software product 120.

At step 712, licensing entity 104 determines if license 122 is limited to or belongs to a pre-existing license class. Licensing entity 104 then determines if computing system 110 is permitted to utilize software product 120 via license 122. Specifically, licensing entity 104 compares the contents of package 108 relating to computing system 110a with the contents of package 502, previously sent by supplier 102. Licensing entity 104 locates the system identifier 112 of computing system 110a within package 108, and further the license class associated with computing system 110a. If the system identifier 112a cannot be located within package 108, computing system 110a is not permitted to utilize software product 120.

At step 714, licensing entity 104 then compares the license class that computing system 110a is assigned to via system identifier 112 with the licensing class of license 122. If the license class of computing system 110a is the same as the license class of license 122, at step 716, computing system 110a is allowed to utilize software product 120. However, if the license class of computing system 110a is not the same as the license class of license 122, at step 718, computing system 110a is not allowed to utilize software product 120.

In a further implementation, licensing entity 104 determines if computing system 110a is permitted to utilize license 122 of software product 120 a plurality of times at any time desired by licensing entity 104, i.e. many-time license validation.

Weighting Scheme of Components 114 within Computing System 110

In a further implementation, licensing entity 104 assigns a weighting to components 114 and component class identifiers 116. The weighting of component class identifiers 116 facilitates determining which combinations of components 114 are allowed to be altered and/or changed and/or removed and/or upgraded while maintaining a validity of license 122 of software product 120 on computing system 110. More specifically, license 124 has an allowable change in weight of components 114 associated therewith such that if the allowable change in weight is exceeded, computing system 110 is not within the same license class as the license class of license 124.

In a first example, a weight of 20 is assigned to component 114(1) and a weight of 50 is assigned to component 114(2). The summation of the weight of components 110 that are altered and/or changed and/or removed and/or upgraded specifies a value that is applied against the allowable change in weight of components 114. To that end, continuing the example above, the allowable change in weight of components 114 is 60. More specifically, the summation of the weight of components 114 that may be altered and/or changed and/or removed and/or upgraded is 60. Thus, altering and/or changing and/or removing and/or upgrading component 114(1) results in a change in weight of components 114 of 20, and thus is allowed as the weight of 20 is less than the allowable change in weight of components 114 specified by license 122. Thus, computing system 110 is maintained within the same license class and computing system 110 would be allowed to utilize software product 120. However, altering and/or changing and/or removing and/or upgrading component 114(1) and component 114(2) results in a change in weight of components 110 of 70, and thus is not allowed as the weight of 70 is more than the allowable change in weight of components 114 specified by license 122. Thus, computing system 110 is not maintained within the same license class of the license class of license 122 and computing system 110 would not be allowed to utilize software product 120. The specific weights assigned to components 108 shown and the allowable change in weight of components 114 of license 124 is arbitrary and may have any value to fit the application desired.

In still a further implementation, the allowable change in weight of components 114 specified by license 122 is dependent on the supplier 102. In an example, computing devices 110a and 110b are substantially identical in that components 114 of computing system 110a and components 114 of computing system 110b are substantially the same. However computing system 110a is supplied at a first supplier while computing system 110b is supplied at a second supplier, the second supplier differing from the first supplier. To that end, the allowable change in weight of components 114 specified by license 122 as applied to computing system 110a differs to the allowable change in weight of components 114 specified by license 122 as applied to computing system 110b.

In still a further implementation, the allowable change in weight of components 114 specified by license 122 is dependent on a time period when computing devices 110 were manufactured. In an example, computing devices 110a and 110b are substantially identical in that components 114 of computing system 110a and components 114 of computing system 110b are substantially the same. However computing system 110a is manufactured at a first time A while computing system 110*b* is manufactured at a second time B, the second time B differing from the first time A. To that end, the allowable change in weight of components 114 specified by license 122 as applied to computing system 110*a* differs to the allowable change in weight of components 114 specified by license 122 as applied to computing system 110*b*.

In a further implementation, licensing entity 104 alters the allowable change in weight of components 114 specified by license 122 at any time desired, i.e. licensing entity 104 alters the allowable change in weight of components 114 specified by license 122 dynamically.

In still a further implementation, any combination of the above-mentioned weighting schemes may be employed.

CONCLUSION

Although embodiments for implementing remote auto provisioning and publication of applications have been described in language specific to structural features and/or methods, it is to be understood that the subject of the appended claims is not necessarily limited to the specific features or methods described. Rather, the specific features and methods are disclosed as exemplary implementations for providing remote auto provisioning and publication of applications.

What is claimed is:

1. A method comprising:
receiving a request from a computing system for validation of a license of a software product installed thereon, the request being accompanied by a plurality of component descriptors that specify constituent hardware components of the computer system, wherein the component descriptors comprise component class identifiers of the components;
determining whether the license is of a type limited to one or more pre-determined license classes, wherein the pre-determined license classes are defined at least in part by unique component identifiers of the hardware components and component class identifiers of the hardware components; and
if the license is of a type limited to one or more pre-determined license classes, using the component descriptors to verify that the computing system belongs to a type of computing system that is associated with a license class indicated in the license of the software product.

2. A method as recited in claim 1, wherein the component descriptors further comprise unique component identifiers of the hardware components.

3. A method as recited in claim 1, wherein the component descriptors further comprise system identifiers of the computing system.

4. A method as recited in claim 1, further comprising receiving a plurality of system identifiers for a plurality of computing devices from a supplier, the plurality of system identifiers specifying the plurality of computing devices and components of each of the plurality of computing devices.

5. A method as recited in claim 4, further comprising categorizing the plurality of system identifiers into the one or more pre-determined license classes based at least in part upon an identifier of the supplier.

6. A method as recited in claim 1, wherein using further comprises determining if the one or more pre-determined license classes of the computing devices is the same as the one or more pre-determined license classes of the license.

7. The method as recited in claim 1, wherein using further comprises applying a weighting scheme to the hardware components of the computing system to verify that the computing system belongs to the one or more pre-determined license classes.

8. The method as recited in claim 7, further comprising altering the weighting scheme dynamically.

9. The method as recited in claim 1, wherein the component descriptors are hashed to protect identifiable information of the computing system.

10. One or more computer-readable storage media, storing processor-executable instructions that, when executed on a processor, configure the processor to perform acts for validation of a license of a software product, the acts comprising:
receiving a request from a computing system for validation of a license of a software product installed thereon, the request being accompanied by a plurality of component descriptors that specify constituent hardware components of the computer system, wherein the component descriptors comprise component class identifiers of the hardware components, unique component identifiers of the hardware components, and system identifiers of the computing system;
determining whether the license is of a type limited to one or more pre-determined license classes, wherein the license classes are based at least in part on categorization information of a computing system type, the computing system type defined at least in part by unique component identifiers of the hardware components and the component class identifiers of the hardware components; and
if the license is of a type limited to one or more pre-determined license classes, verifying that the computing system belongs to the one or more pre-determined license classes by using the component descriptors.

11. The one or more computer-readable storage media of claim 10, further comprising receiving a plurality of system identifiers for a plurality of computing devices from a supplier, the plurality of system identifiers specifying the plurality of computing devices and components of each of the plurality of computing devices.

12. The one or more computer-readable storage media of claim 11, further comprising categorizing the plurality of system identifiers into the one or more pre-determined license classes based at least in part upon an identifier of the supplier.

13. The one or more computer-readable storage media of claim 10, wherein verifying further comprises determining if the one or more pre-determined license classes of the computing devices are the same as the one or more pre-determined license classes of the license.

14. The one or more computer-readable storage media of claim 10, wherein the component descriptors are hashed to protect identifiable information of the computing system.

15. A system for validating a license of a software product comprising:
a memory and a processor;
a communication module, stored in the memory and executable on the processor, that receives a request from a computing system for validation of the license of the software product installed thereon, the request being accompanied by a plurality of component descriptors that specify constituent hardware components of the computer system, wherein the component descriptors comprise component class identifiers of the hardware components, unique component identifiers of the hardware components, and system identifiers of the computing system;
a license categorization module, stored in the memory and executable on the processor, that determines whether the license is of a type limited to one or more pre-determined license classes, wherein the license classes are based at least in part on categorization information of computing system type, the computing system type defined at least in part by unique component identifiers of the hardware components and component class identifiers of the hardware components;

a license validation module, stored in the memory and executable on the processor, that compares the component descriptors accompanying the request with the one or more pre-determined license classes to verify that the computing system belongs to the one or more pre-determined license classes;

a permission granting module, stored in the memory and executable on the processor, that allows the request for validation if the computing system belongs to at least one of the one or more pre-determined license classes.

16. The system of claim 15, wherein the communication module is further configured to receive a plurality of system identifiers for a plurality of computing devices from a supplier, the plurality of system identifiers specifying the plurality of computing devices and components of the plurality of computing devices.

17. The system of claim 16, wherein the license categorization module is further configured to categorize the plurality of system identifiers into the one or more pre-determined license classes based at least in part upon an identifier of the supplier.

18. The system of claim 15, wherein the license validation module is further configured to determine if the one or more pre-determined license classes of the computing devices is the same as the one or more pre-determined license classes of the license.

19. The system of claim 15, wherein the component descriptors are hashed to protect identifiable information of the computing system.

20. The system of claim 15, wherein license categorization module is further configured to apply a weighting scheme to the unique component identifiers of the hardware components and the component class identifiers of the hardware components to categorize the computing system into the one or more pre-determined license classes.

* * * * *